United States Patent [19]

Chamblee et al.

[11] Patent Number: 5,552,125
[45] Date of Patent: Sep. 3, 1996

[54] DIELECTRIC COATING FOR OZONE GENERATOR ELECTRODES

[75] Inventors: J. Wayne Chamblee, Queensbury, N.Y.; Eskil L. Karlson, Erie, Pa.

[73] Assignee: Kamyr, Inc., Glens Falls, N.Y.

[21] Appl. No.: 179,566

[22] Filed: Jan. 10, 1994

[51] Int. Cl.$^6$ ............................................. C23C 4/10
[52] U.S. Cl. ........................ 422/186.07; 427/453
[58] Field of Search ................ 422/186.07; 427/570, 427/453

[56] References Cited

U.S. PATENT DOCUMENTS

| | | | |
|---|---|---|---|
| 4,049,707 | 9/1977 | Harter et al. | 250/531 |
| 4,650,648 | 3/1987 | Beer et al. | 422/186.07 |
| 4,690,803 | 9/1987 | Hirth | 422/186.18 |
| 4,774,062 | 9/1988 | Heinemann | 422/186.19 |

Primary Examiner—Donald P. Walsh
Assistant Examiner—Daniel Jenkins
Attorney, Agent, or Firm—Nixon & Vanderhye P.C.

[57] ABSTRACT

An ozone generator has one or both of the tube type electrodes coated with a dielectric that has high dielectric strength, high dielectric constant, and low piezoelectric activity, and can be applied with a small thickness (less than 0.5 mm). The dielectric has a mixed oxide composition having a dielectric strength of at least about 800 volts/mil, has a dielectric constant that is at least 200, and has low enough piezoelectric activity that it will not ablate, crack, or other otherwise suffer damage as a result of high voltage application over months of use. A metal electrode for use in an ozone generator has a dielectric coating on a surface thereof having a composition comprising: about 30–70% lead oxide, about 2–8% barium oxide, about 2–12% lanthanum oxide, about 3–18% titanium dioxide, about 12–40% zirconium dioxide, and trace materials. A method of coating a metal electrode for use in an ozone generator may include plasma spraying (and the steps leading up to effect of plasma spraying), or dip or spin coating followed by sintering.

29 Claims, 3 Drawing Sheets

DIELECTRIC COATING FOR OZONE GENERATOR ELECTRODES

BACKGROUND AND SUMMARY OF THE INVENTION

The invention relates to an ozone generator, a metal electrode for use in an ozone generator, and methods of coating a metal electrode for use in an ozone generator. The invention is particularly applicable to tube type ozone generators.

Conventional tube type ozone generators use glass, quartz, or ceramic dielectrics. These dielectric materials have several drawbacks including relatively low dielectric strength (e.g. 300 volts/mil) and low dielectric constant (e.g. 6–10). The low electrical property values require that the dielectrics have a wall thickness between 3–5 millimeters to prevent electrical breakdown while sustaining the corona discharge necessary for ozone generation from oxygen containing gases. A thin layer of metallic silver or other low resistance material is applied to one side of the dielectric to serve as an electrical conductor.

The limited physical strength properties of these materials also require large supports. Although the ceramic materials have better electrical properties than the glass materials, physical strength property limitations require that the ceramics have even greater wall thickness than the glass material. The thick cross section and poor thermal conductivity of all these materials inhibits heat transfer. As heat is generated in these materials during ozone generator operation, the high temperature of the dielectrics causes thermal decomposition of the ozone being generated in the annular space between the electrodes of the ozone generator.

Titanium oxides have been used to replace glass dielectrics in ozone generators. Titanium oxide dielectrics are also far from ideal, however typically having a dielectric constant of about 80–170. There have been attempts to make higher dielectric strength dielectrodes for ozone generators using barium titanates since they can have dielectric constants of greater than 1,000. However such attempts have failed primarily because of the piezoelectric properties of barium titanates. When subjected to an electrical potential which applies an alternating current greater than 10,000 volts at a frequency of about 500 hertz (which is at the low end of typical for ozone generators), the dielectric coating typically ablates, cracks, or otherwise suffers damage as a result of such high voltage application over months of use.

According to the present invention, an ozone generator, and electrodes for an ozone generator, may be constructed which overcome the problems discussed above with respect to conventional electrodes in ozone generators. According to the invention, a dielectric is provided for an ozone generator which has a high dielectric constant, high dielectric strength, and low enough piezoelectric properties so that the dielectric will not ablate, crack, or otherwise suffer damage as a result of high voltage application even over months of use. The dielectrics according to the invention may have dielectric constants of greater than 1,000, like barium titanates, yet do not have the adverse piezoelectric properties thereof. The dielectrics preferably employed according to the present invention are known as PLZT mixed oxide ceramics, the designation "PLZT" referring to lead, lanthanum, zirconium and titanate. The concentration of individual components of such a mixed oxide ceramic affects the crystalline structure of the product as well as its electrical properties, and by varying the composition of the PLZT mixed oxide it is possible to make a material with a very high dielectric constant, high dielectric strength, and low piezoelectric activity.

According to one aspect of the present invention an ozone generator is provided comprising: First and second electrodes. Means for mounting the electrodes to define a flow path for oxygen containing gas between them. Means for applying an electrical potential to the electrodes sufficient to generate ozone from oxygen containing gas flowing in the flow path. And, a dielectric between at least one of the electrodes and the flow path, the dielectric comprising a mixed oxide composition having a dielectric constant of at least 200, a dielectric strength of at least about 800 volts/mil, and a low enough level of piezoelectric activity such that when the means for applying an electrical potential applies an alternating current greater than 10,000 volts at a frequency of about 500 hertz the dielectric coating will not ablate, crack, or otherwise suffer damage as a result of such high voltage application over months of use.

The first electrode may be a tube cantilevered at one end, and including another tube within the hollow interior thereof for circulating insulating coolant fluid (such as sulfur hexafluoride gas) therethrough. Typically both of the electrodes are tubular, and the cooperating surfaces of the tubes (inner or outer) are coated with the dielectric adjacent the gas flow path, although they need not be coated remote from the flow path. Either a conductive or a nonconductive cooling fluid may be circulated into operative association with the outer of the tubular electrodes.

The preferred dielectric coating according to the invention, for use on the electrode generator, on a metal surface thereof, has a composition comprising: about 30–70% lead oxide, about 2–8% barium oxide, about 2–12% lanthanum oxide, about 3–18% titanium dioxide, about 12–40% zirconium dioxide, and trace materials. The trace materials include silver, bismuth oxide, CdO, or combinations thereof. Dielectric constants of greater than 1,000 are relatively simple to obtain, in fact dielectric constants of well over 2,000 are practical.

A metal electrode can be coated a number of different ways for use in the ozone generator. For example according to one method the following steps are practiced substantially sequentially: (a) Mixing a plurality of different metal oxides together to form a mixed oxide composition. (b) Agglomerating the mixed oxide composition with about 1–5 weight percent binder and plasticizer combined to develop a particle size distribution suitable for plasma spraying. (c) Subjecting the agglomerated mixed oxide composition to treatment to provide a substantially uniform particle size. And, (d) plasma spraying the agglomerated mixed oxide composition substantially uniform particle size composition onto the metal electrode at a temperature high enough to substantially completely volatize the binder but low enough to substantially prevent volatization of low boiling point metals contained in the metal oxide mixture.

Step (d) is typically practiced at a temperature of about 1200°–1300° C., while step (a) is practiced to provide the composition set forth above. Step (c) is typically practiced by screening the agglomerated mixed oxide to remove particles having a maximum dimension above about 50 microns and below about 30 microns. Step (b) may be practiced utilizing polyvinyl alcohol as a binder and glycerol as a plasticizer.

According to another aspect of the present invention, a method of coating a metal electrode for use in an ozone generator comprises the steps of substantially sequentially: (a) Mixing a plurality of different metal oxides together to form a mixed oxide composition. (b) Stabilizing the mixed oxide composition in a volatile solution. (c) Applying the mixed oxide composition volatile solution to the surface of the metal electrode to achieve a desired coating thickness. And, (d) firing the coated electrode to sinter the mixed oxide composition.

Step (c) may be practiced by repeatedly dipping the electrode into the mixed oxide composition in a volatile solution, and air drying the coating formed after each dipping, until the desired thickness (typically less than 0.5 mm, e.g. 20 mils or less) has been obtained. Step (c) may alternatively be practiced by spin coating and then air drying the coating formed to the desired thickness after spin coating.

It is the primary object of the present invention to provide an ozone generator, and a metal electrode for use in an ozone generator, having a high dielectric strength, a very high dielectric constant, and low piezoelectric activity. This and other objects of the invention will become clear from an inspection of the detailed description of the invention and from the appended claims.

DETAILED DESCRIPTION OF THE DRAWINGS

Figure 1:
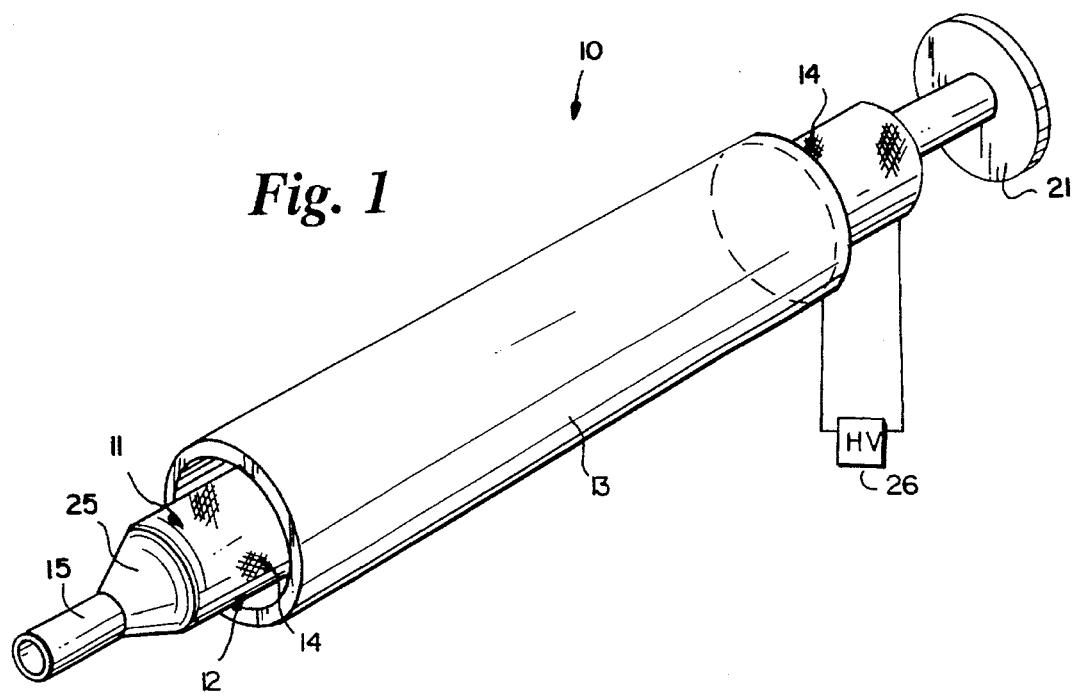
FIG. 1 is a top perspective view of electrode and cooling fluid circulating components of an exemplary ozone generator according to the present invention.
Figure 2:
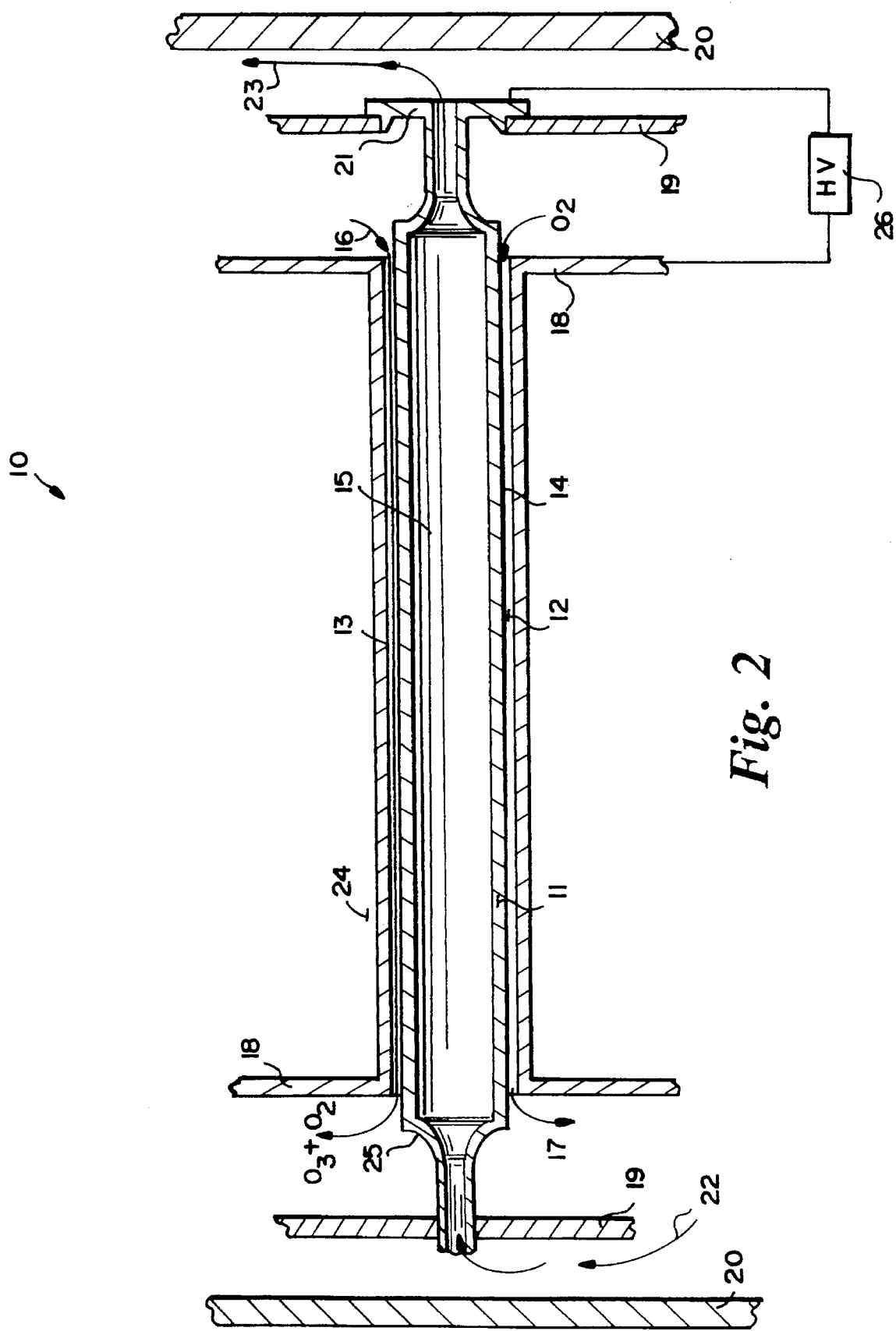
FIG. 2 is a side cross-sectional view of the apparatus of FIG. 1 in association with other mounting components and showing the flow of coolant and oxygen and ozone gases in association therewith.

FIGS. 1 and 2 illustrate a first embodiment of the major components of an exemplary ozone generator according to the present invention. The ozone generator is shown generally by reference 10 in FIGS. 1 and 2 and includes a first tubular inner electrode 11 and a second, outer tubular electrode 13 substantially concentric with the electrode 11 and mounted so as to define a flow path 12 (annular in configuration) for oxygen containing gas between the electrodes 11, 13. One or both of the outer surface of the inner electrode 11 or the inner surface of the outer electrode 13 is/are coated with a dielectric, shown generally by reference numeral 14 on only the inner electrode 11 in FIGS. 1 and 2. This dielectric coating 14 will be more fully described subsequently.

The inner electrode 11 includes a hollow interior 15 for the passage of coolant therein, and FIG. 2 illustrates the passage of oxygen containing gas (arrows) 16 into the annular flow path 12 between the dielectric 14 and the outer electrode 13, and shows arrows 17 for the out flow of generated ozone in the oxygen carrier gas. Both of the tubular electrodes 11, 13 may be made of a wide variety of metals, or other conducting material, but typically are of stainless steel.

The plate wall 18 holds the outer electrode 13 at each end thereof. In a complete ozone generator typically these walls 18 hold a large number of tubular electrodes, such as described in co-pending application Ser. No. 08/118,793 filed Sep. 10, 1993 (atty. ref. 10–858). The insulator plates 19 mount the ends of the inner tubular electrode 11, one end being mounted by a flange 21 to the insulator plate 19 as seen in FIG. 2, the flange 21 typically also being of stainless steel or other conductive material.

Reference numerals 20 in FIG. 2 illustrate schematically the outer ends of a tank that typically encloses a complete ozone generator, which would have a plurality of the electrode assemblies 11, 13 mounted in plates 18, 19. The plates 18, 19 are attached to the inner surface of the tank like enclosure 20.

A coolant is circulated in the interior 15 of the inner electrode 11, entering at one end as indicated by arrows 22, and exiting at the other end as indicated by arrows 23 in FIG. 2. This coolant must be an insulator, and may include a gas such as sulfur hexachloride, or may be an insulating liquid. A circulating fluid coolant is also provided in the area 24 around each of the outer electrode tubes 13, the cooling fluid in the volume 24 being either conductive or insulative, the most simple coolant being water. Note that the ends of the inner electrode 11, as shown at 25 in FIGS. 1 and 2, may not be coated with dielectric 14.

The ozone generator 10 also comprises a high voltage source 26 which is means for applying an electrical potential to the electrodes 11, 13 sufficient to generate ozone from the oxygen gas flowing in the flow path 12.

Figure 3:
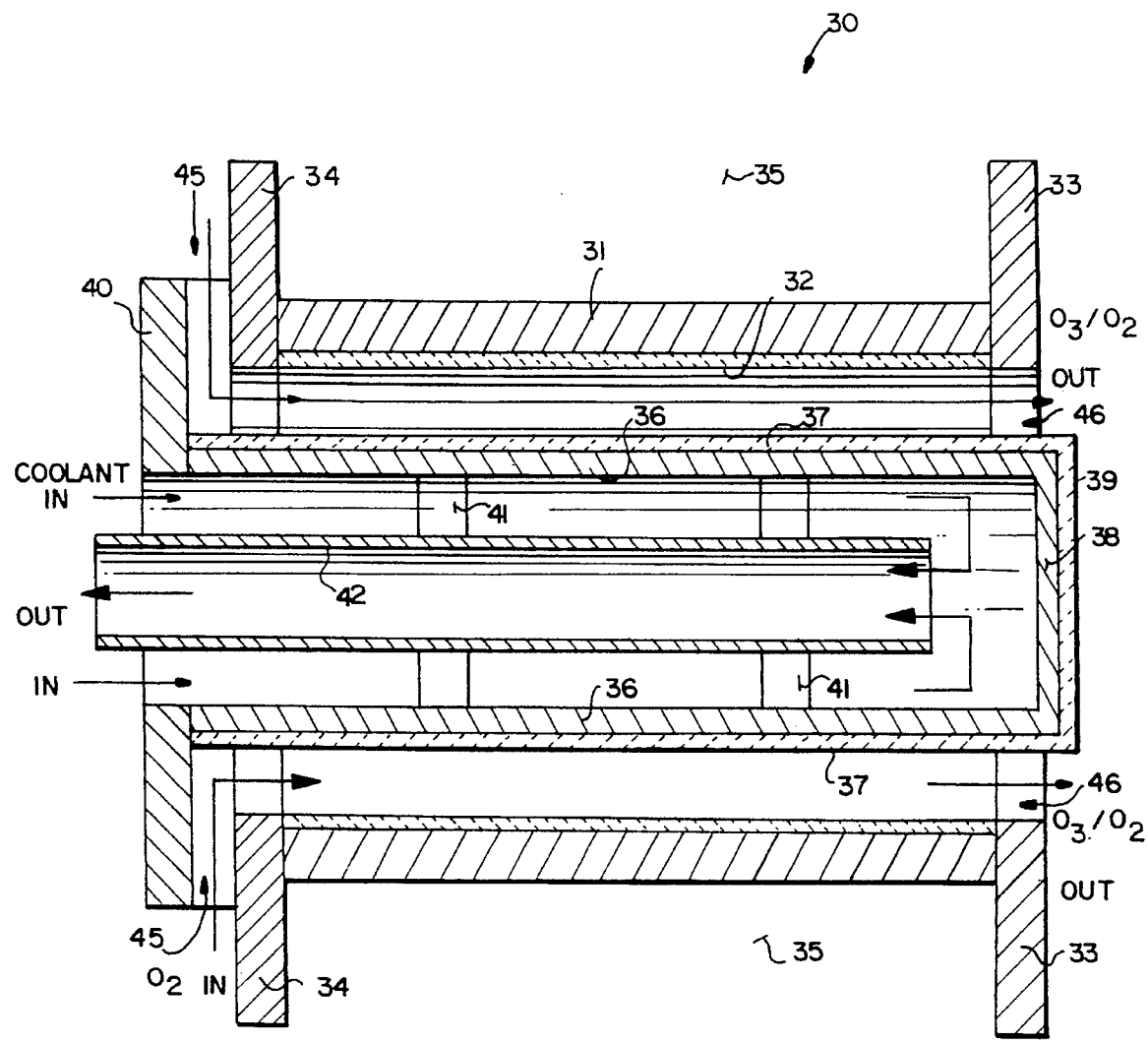
FIG. 3 is a view like that of FIG. 2 only showing another exemplary embodiment of ozone generator electrode and coolant circulating components according to the present invention.

Another exemplary ozone generator is shown generally by reference numeral 30 in FIG. 3. In this embodiment, the outer electrode 31 is shown with a dielectric coating 32 on the inner surface thereof, and electrode 31 is mounted at opposite ends by plates 33, 34, while the inner electrode 36 is shown with the dielectric coating 37 on the outer circumferential surface thereof. In this embodiment the inner electrode 36 is also shown with one of the ends thereof closed off by wall 38, which has the dielectric coating 39 thereon.

The inner electrode 36 is mounted in a cantilevered fashion by a mounting plate 40, with spacers 41 (in a spider-like configuration) supporting a hollow coolant circulating tube 42 within the hollow interior of the inner electrode 36. The electrodes 31 and 36, and the tube 42, are substantially concentric.

One coolant is circulated in the volume 35 surrounding the outer tubular electrode 31, while another coolant is circulated so that it flows between the inner surface of the electrode 36 and the outer surface of the tube 42, and then when it impacts the wall 38 returns in the interior of the tube 42.

Oxygen containing gas, such as air or substantially pure (e.g. more than 90%) oxygen, is introduced at 45 into a flow path between dielectric coatings 32, 37, generated ozone in oxygen carrier gas being withdrawn from the gas flow path at outlet 46. A high voltage, typically at least 10,000 volts and normally 15,000 volts or more, typically at a frequency of about 500 hertz, is applied as an alternating current to the electrodes 31, 36.

According to the present invention, the dielectric providing the coatings 14, 32, 37 is preferably PLZT mixed oxide. The initial composition of the material requires special attention since the composition may change during application to the ozone generator metal electrode, and changes in material composition can cause dramatic changes in the electrical and physical properties of the material. Typical composition components and ranges are:

| | |
|---|---|
| Lead Oxide | about 30–70% |
| Barium Oxide | about 2–8% |
| Lanthanum Oxide | about 2–12% |
| Titanium Dioxide | about 3–18% |
| Zirconium Dioxide | about 12–40% |

The material also may contain trace materials (typically less than 1% of the composition), such as metallic silver, bismuth oxide, and/or CdO.

Table I below shows two exemplary PLZT mixed oxide compositions, and compares the dielectric constant thereof to glass dielectric or titanium dioxide dielectric. The PLZT sample #1 is outside the ranges set forth above, and while acceptable for some situations, does not have all the desirable attributes of the PLZT sample #2 which has the components in the composition range set forth above. Note that the difference in dielectric constant between the two samples is a ratio greater than 60 to 1.

| | PLZT Sample #1 | PLZT Sample #2 | Glass Dielectric | $TiO_2$ Dielectric |
|---|---|---|---|---|
| $ZrO_2$ | 60.57 | 25.62 | | $TiO_2$ is a major component |
| $TiO_2$ | 18.47 | 10.48 | | |
| PbO | 4.20 | 55.21 | many compositions available | |
| Ag | 0.22 | 0.65 | | |
| CdO | 0.02 | 0.27 | | |
| BaO | 5.06 | 3.22 | | |
| LaO | 11.45 | 4.55 | | |
| [All materials in weight %] | | | | |
| Dielectric Constant (K) | 40 | 2471 | 6–10 | 80–170 |

The dielectric strength of the mixed oxide dielectric coating (14, 32, 37) according to the present invention preferably is at least about 800 volts/mil, and typically is greater than 1,000 volts/mil. The value will vary with temperature. The thickness of the material (that is the thickness of the coating) will depend upon the dielectric strength, voltage, and other parameters. For example if the dielectric strength of the dielectric material forming the coating 14, 32, 37 is 800 volts/mil at system operating temperature and at an operating voltage of the generator of about 15,000 volts, with alternating current applied at about 500 hertz, the desired total dielectric coating thickness is less than 0.5 mm, typically about 20 mils. This 20 mil thickness may be provided for the coating 14, or a 10 mil thickness for each of the coatings 32, 37.

Figure 4:
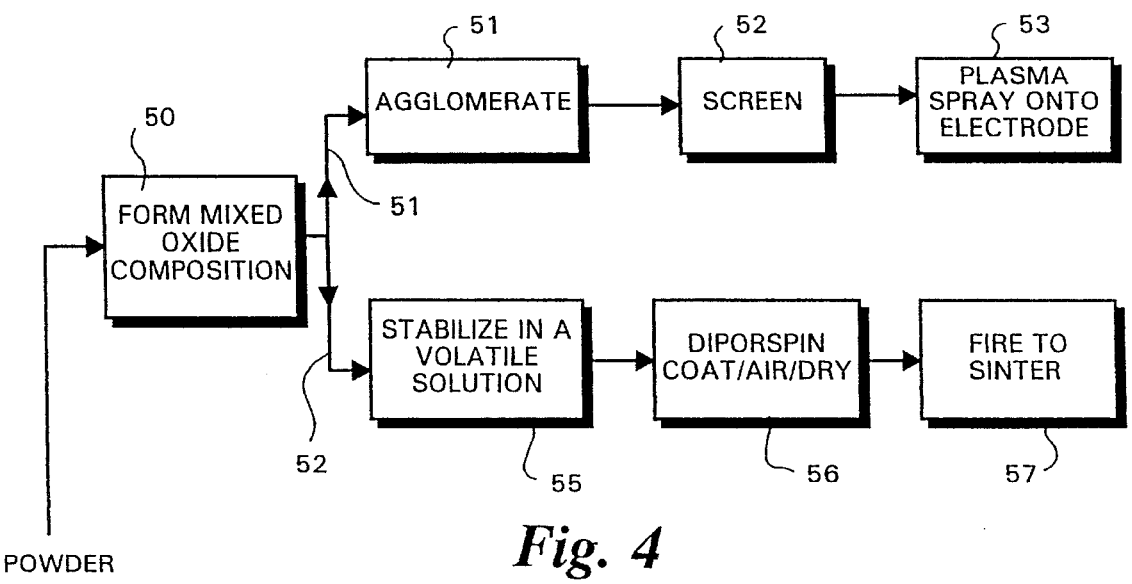
FIG. 4 is a box diagram schematically illustrating various methods for coating ozone generator electrodes with dielectric according to the present invention.

FIG. 4 schematically illustrates exemplary methods for providing the coating 14, 32, or 37 according to the present invention. The first step is to form a mixed oxide composition indicated schematically by box 50 in FIG. 4. The components of the mixed oxide composition are as described above, and they typically have a 1–2 micron particle size. The upper branch 51 of FIG. 4 illustrates a plasma spraying technique, while the lower branch 52 indicates two different types of coating techniques.

For the plasma spraying branch 51, the mixed oxide composition from box 50 is passed to an agglomeration stage 51. There the PLZT material is agglomerated with about 1–5 weight percent binder (e.g. polyvinyl alcohol) and plasticizer (e.g. glycerol which may be added for viscosity adjustment). This develops a particle size distribution suitable for plasma spray application. The powdered metal PLZT particle size of 1–2 microns is much less than the size desirable for proper application by plasma spraying. The agglomeration binder will volatize during the plasma spraying operation.

After blending of the agglomerated material in box 51, it is passed to another stage, e.g. box 52 where the uniformity of the size of the agglomerated particles is controlled. Typically the box 52 is a screening stage at which agglomerated particles having sizes lower than about 30 microns, or larger than about 50 microns, are screened out to provide a substantially uniform particle size agglomerated mixture, the vast majority of the particles being in the size range of 30–50 microns which is ideal for plasma spraying.

After screening in box 52, the composition is plasma sprayed onto the electrode as indicated by box 53 in FIG. 4. Conventional plasma spraying techniques are used, the temperature of the plasma flame being carefully controlled to avoid volatilization of the lead and other low boiling metals of the mixture, while allowing complete binder volatilization. Where lead oxide is a significant component of the agglomerated mixture, and the binder is polyvinyl alcohol, a temperature of about 1200°–1300° C. is ideal.

Branch 52 illustrates another technique for forming the coatings 14, 32, 37. The first step of this procedure is the stabilization of the suspension of the 1–2 micron size PLZT particles in a volatile solution, as indicated by box 55 in FIG. 4. The typical mixture might contain isopropanol as a solvent and a stabilizing agent such as polyvinylpyrrolidone (povidone PVP), to keep the mixed oxide suspension stable. Then the mixed oxide composition volatile solution is applied to the surface of a metal electrode to achieve the desired coating thickness, as indicated schematically at box 56 in FIG. 4. One particular coating technique is called dip coating, in which the electrode to be coated is dipped into the solution containing the mixed oxide particles. After each dipping the coating is dried, typically air dried. This process is repeated until the desired coating thickness (less than 0.5 mm in the vast majority of situations, e.g. typically about 10–20 mils) is reached. The coated electrode is then fired—as indicated schematically by box 57 in FIG. 4—to sinter the mixed oxide material.

As an alternative to dip coating, as also indicated schematically in box 56 of FIG. 4, spin coating may be utilized. Spin coating is similar to dip coating except that the solution is applied to the surface of the electrode, which is being rotated on its longitudinal axis. The coating solution is applied to the surface of the electrode at the approximate mid-point of the electrode length. The coating then spreads uniformly outwardly along the surface of the rotating electrode by natural forces. After the coating achieves the desired thickness application of the solution to the mid point is terminated, rotation of the electrode is stopped, the coating is dried (e.g. air dried), and then the firing step—box 57—is practiced.

Utilizing the techniques described above, dielectric coatings having dielectric constants of easily over 1,000, and typically over 2,000 or even 3,000, are produced with a dielectric strength of at least 800 volts per mil and typically about 1,000 volts per mil or more. Even when subjected to high voltage (e.g. greater than 10,000 volts) alternating current at approximately 500 hertz, the dielectric coating 14, 32, 37 does not ablate, crack, or otherwise suffer damage even over extended usage (e.g. months of use in an ozone generator).

It will thus be seen that according to the present invention an advantageous ozone generator, electrode for an ozone generator, and method of coating the electrode for use in the ozone generator, have been provided. While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent structures and processes.

What is claimed is:

1. An ozone generator comprising:
   first and second electrodes;
   means for mounting said electrodes to define a flow path for oxygen containing gas between them;
   means for applying an electrical potential to said electrodes sufficient to generate ozone from oxygen containing gas flowing in said flow path; and
   a mixed oxide dielectric between at least one of said electrodes and said flow path, said dielectric comprising a mixed oxide composition having a dielectric constant of at least 200, a dielectric strength of at least about 800 volts/mil, and a low level of piezoelectric activity.

2. A generator as recited in claim 1 wherein said first electrode is a tube having a hallow interior and cantilevered at one end thereof, and includes another tube within the hollow interior thereof for circulating insulating cooling fluid therethrough.

3. A generator as recited in claim 1 wherein said dielectric is coated on one or both of said electrodes adjacent said flow path.

4. A generator as recited in claim 3 wherein said dielectric coating has a composition comprising: about 30–70% lead oxide, about 2–8% barium oxide, about 2–12% lanthanum oxide, about 3–18% titanium dioxide, about 12–40% zirconium dioxide, and trace materials.

5. A generator as recited in claim 4 wherein the total thickness of dielectric coating on one or both of said electrodes is less than 0.5 mm.

6. A generator as recited in claim 3 wherein at least one of said electrodes comprises a robe having a circumferential surface and first and second ends, at least said second end being remote from said flow path, and not coated with dielectric.

7. A generator as recited in claim 3 wherein at least said first electrode is hollow; and further comprising means for circulating a non-conductive cooling fluid through said hollow first electrode, and means for circulating a conductive or non-conductive cooling fluid into operative association with said second electrode.

8. A metal electrode for use in an ozone generator having a dielectric coating on a surface thereof, said dielectric coating having a composition comprising: about 30–70% lead oxide, about 2–8% barium oxide, about 2–12% lanthanum oxide, about 3–18% titanium dioxide, about 12–40% zirconium dioxide, and trace materials.

9. An electrode as recited in claim 8 wherein the trace materials include silver, bismuth oxide, CdO, or combinations thereof.

10. An electrode as recited in claim 8 wherein said electrode is tubular, and wherein said coated surface thereof comprises an outer or inner circumferential surface of said tube, and wherein said dielectric coating has a dielectric constant of at least 1000 and a dielectric strength of about 800 volts/mil or more.

11. A method of coating a metal electrode for use in an ozone generator, comprising the steps of substantially sequentially:
    (a) mixing a plurality of different metal oxides together to form a mixed oxide composition;
    (b) agglomerating the mixed oxide composition with about 1–5 weight percent binder and plasticizer combined to develop a particle size distribution suitable for plasma spraying;
    (c) subjecting the agglomerated mixed oxide composition to treatment to provide a substantially uniform particle size; and
    (d) plasma spraying the agglomerated mixed oxide composition substantially uniform particle size composition onto the metal electrode at a temperature high enough to substantially completely volatize the binder but low enough to substantially prevent volatization of low boiling point metals of the metal oxide mixture.

12. A method as recited in claim 11 wherein step (d) is practiced at a temperature of about 1200–1300 degrees C.

13. A method as recited in claim 12 wherein step (a) is practiced to provide a composition comprising: about 30–70% lead oxide, about 2–8% barium oxide, about 2–12% lanthanum oxide, about 3–18% titanium dioxide, about 12–40% zirconium dioxide, and trace materials.

14. A method as recited in claim 13 wherein step (c) is practiced by screening the agglomerated mixed oxide to remove particles having a maximum dimension above about 50 microns and below about 30 microns.

15. A method as recited in claim 14 wherein step (b) is practiced using polyvinyl alcohol as a binder and glycerol as a plasticizer.

16. A method of coating a metal electrode for use in an ozone generator, comprising the steps of substantially sequentially:
    (a) mixing a plurality of different metal oxides together to form a mixed oxide composition;
    (b) stabilizing the mixed oxide composition in a volatile solution;
    (c) applying the mixed oxide composition volatile solution to the surface of the metal electrode to achieve a desired coating thickness; and
    (d) firing the coated electrode to sinter the mixed oxide composition.

17. A method as recited in claim 16 wherein step (c) is practiced by repeatedly dipping the electrode into the mixed oxide composition in a volatile solution, and drying the coating formed after each dipping, until the desired thickness has been obtained.

18. A method as recited in claim 16 wherein step (c) is practiced by spin coating and then drying the coating formed to the desired thickness after spin coating.

19. A method as recited in claim 16 wherein step (a) is practiced to provide a composition comprising: about 30–70% lead oxide, about 2–8% barium oxide, about 2–12% lanthanum oxide, about 3–18% titanium dioxide, about 12–40% zirconium dioxide, and trace materials.

20. A generator as recited in claim 4 wherein said trace materials include silver, oxides containing bismuth or cadmium, or combinations thereof.

21. A generator as recited in claim 1 wherein the dielectric coating comprises a PLZT mixed oxide coating.

22. An ozone generator as recited in claim 3 wherein the total thickness of dielectric coating on one or both of said electrodes is about 20 mils.

23. An ozone generator as recited in claim 4 wherein said dielectric has a dielectric constant of at least a thousand and a dielectric strength of at least 1,000 volts/mil.

24. An ozone generator as recited in claim 1 wherein said dielectric has a dielectric constant of at least a thousand and a dielectric strength of at least 1,000 volts/mil.

25. A method as recited in claim 11 wherein step (c) is practiced by screening the agglomerated mixed oxide to remove particles having a maximum dimension above about 50 microns and below about 30 microns.

26. A method as recited in claim 11 wherein step (b) is practiced using both polyvinyl alcohol as a binder and glycerol as a plasticizer.

27. A method as recited in claim 11 wherein step (d) is practiced to provide a coating thickness of the agglomerated mixed oxide composition dielectric on the metal electrode of about 10–49 mils.

28. A method as recited in claim 16 wherein step (c) is practiced to provide a coating thickness of about 10–49 mils.

29. A method as recited in claim 16 wherein step (b) is practiced by mixing the mixed oxide composition with isopropanol solvent and a stabilizing agent.

* * * * *